(12) United States Patent
Ji et al.

(10) Patent No.: US 12,061,726 B2
(45) Date of Patent: Aug. 13, 2024

(54) SECURELY COMMUNICATING AND CUSTOMIZING ARTIFICIAL INTELLIGENCE MODULES

(71) Applicant: Motorola Mobility LLC, Chicago, IL (US)

(72) Inventors: Zhengping Ji, Hinsdale, IL (US); Rachid M. Alameh, Crystal Lake, IL (US); Robert S. Witte, Algonquin, IL (US)

(73) Assignee: Motorola Mobility LLC, Chicago, IL (US)

( * ) Notice: Subject to any disclaimer, the term of this patent is extended or adjusted under 35 U.S.C. 154(b) by 700 days.

(21) Appl. No.: 15/931,298

(22) Filed: May 13, 2020

(65) Prior Publication Data
US 2021/0357801 A1 Nov. 18, 2021

(51) Int. Cl.
*G06F 21/62* (2013.01)
*G06F 16/27* (2019.01)
(Continued)

(52) U.S. Cl.
CPC ............ *G06F 21/64* (2013.01); *G06F 16/27* (2019.01); *G06F 18/214* (2023.01); *G06F 21/602* (2013.01); *G06F 21/6245* (2013.01); *G06N 5/04* (2013.01); *G06N 20/00* (2019.01); *G06V 10/764* (2022.01); *G06V 20/30* (2022.01); *G06V 40/172* (2022.01); *H04L 9/0819* (2013.01); *H04L 9/30* (2013.01); *H04L 9/50* (2022.05)

(58) Field of Classification Search
CPC .... G06F 16/27; G06F 21/602; G06F 21/6245; G06V 20/00; H04L 9/0819; H04L 9/30; H04L 9/50
See application file for complete search history.

(56) References Cited

U.S. PATENT DOCUMENTS

2001/0015919 A1* 8/2001 Kean .................. G06F 21/76
711/E12.092
2007/0260890 A1* 11/2007 Bandholz ............ G06F 21/105
713/193
(Continued)

OTHER PUBLICATIONS

"Blockchain Use Cases and Applications by Industry", Retrieved at: https://consensys.net/blockchain-use-cases/—on Feb. 25, 2020, 17 pages.
(Continued)

*Primary Examiner* — Vance M Little
(74) *Attorney, Agent, or Firm* — FIG. 1 Patents

(57) ABSTRACT

A user can customize (also referred to as train) an AI module, which includes any of a variety of machine learning systems. The AI module can be used by the device on which the AI module is trained or can be communicated to other devices in the same environment (e.g., the same home). The AI module can also be communicated in a secure and private manner to a device in another environment (e.g., another user's home). To do so, the AI module is encrypted and added to a blockchain, and the blockchain is communicated via a peer-to-peer network to the device in the other environment. The recipient of the blockchain can then decrypt the AI module and use the AI module in that other environment, including further training the AI module for use in that other environment.

20 Claims, 7 Drawing Sheets

(51) Int. Cl.

| | | |
|---|---|---|
| *G06F 18/214* | (2023.01) | |
| *G06F 21/60* | (2013.01) | |
| *G06F 21/64* | (2013.01) | |
| *G06N 5/04* | (2023.01) | |
| *G06N 20/00* | (2019.01) | |
| *G06V 10/764* | (2022.01) | |
| *G06V 20/30* | (2022.01) | |
| *G06V 40/16* | (2022.01) | |
| *H04L 9/08* | (2006.01) | |
| *H04L 9/30* | (2006.01) | |
| *H04L 9/00* | (2022.01) | |

(56) References Cited

U.S. PATENT DOCUMENTS

| | | | | |
|---|---|---|---|---|
| 2014/0188770 A1* | 7/2014 | Agrafioti | | A61B 5/7267 706/13 |
| 2015/0033221 A1* | 1/2015 | Chari | | H04L 63/105 718/1 |
| 2016/0267340 A1* | 9/2016 | Jensen | | G06V 40/172 |
| 2017/0132625 A1* | 5/2017 | Kennedy | | G06Q 20/065 |
| 2017/0295232 A1* | 10/2017 | Curtis | | G06F 16/27 |
| 2018/0268382 A1* | 9/2018 | Wasserman | | G06Q 20/223 |
| 2018/0309567 A1* | 10/2018 | Wooden | | H04L 63/0428 |
| 2019/0087733 A1* | 3/2019 | Dooley | | G06Q 10/087 |
| 2019/0215149 A1* | 7/2019 | Ramasamy | | G06N 3/02 |
| 2019/0334716 A1* | 10/2019 | Kocsis | | G06N 3/045 |
| 2020/0076576 A1* | 3/2020 | Ahlbäck | | G06F 21/64 |
| 2020/0143267 A1* | 5/2020 | Gidney | | H04L 9/3239 |
| 2021/0142366 A1* | 5/2021 | Umeh | | G06Q 30/0269 |
| 2021/0150527 A1* | 5/2021 | Ur | | H04L 9/3239 |
| 2021/0314163 A1* | 10/2021 | Fabjanski | | H04L 9/3239 |

OTHER PUBLICATIONS

"Blockchain—Wikipedia", Retrieved at: https://en.wikipedia.org/wiki/Blockchain—on Feb. 25, 2020, 20 pages.

* cited by examiner

Computing Device 102

- Display 104
- Microphone 106
- Speaker 108
- Processor System 110
- Operating System 112
- Application System 114
- Communication System 116
- AI System 118
- Customization System 120
- AI Module Transfer System 122

Storage Device 124

SECURELY COMMUNICATING AND CUSTOMIZING ARTIFICIAL INTELLIGENCE MODULES

BACKGROUND

As technology has advanced, our uses for computing devices have expanded. One such use that is becoming increasingly popular is artificial intelligence. Artificial intelligence uses machine learning systems, which are systems that utilize algorithms to learn from, and make predictions on, known data. While these machine learning systems are beneficial, they are not without their problems. One such problem is that it can be difficult to train a machine learning system to make the predictions a user desires due to lack of training data. This can make it difficult for the user to use the machine learning system in the manner he desires, leading to user frustration with the machine learning system and computing device.

BRIEF DESCRIPTION OF THE DRAWINGS

Embodiments of securely communicating and customizing AI modules are described with reference to the following drawings. The same numbers are used throughout the drawings to reference like features and components.

DETAILED DESCRIPTION

Securely communicating and customizing artificial intelligence (AI) modules is discussed herein. Generally, a user can customize (also referred to as train) an AI module, which can include any of a variety of machine learning systems. The AI module can be customized to perform various different operations, such as identify individuals, take particular actions, and so forth. The AI module can be used by the device on which the AI module is trained or can be communicated to other devices in the same environment (e.g., the same home). For example, an AI module trained by one device in the user's home can be communicated to multiple other devices in the user's home.

Furthermore, the AI module can be communicated in a secure and private manner to a device in another environment (e.g., another user's home). To do so, the AI module is encrypted and added to a blockchain, and the blockchain is communicated via a peer-to-peer network to the device in the other environment. The AI module is optionally erased prior to encryption and inclusion in the blockchain to prevent personal information of the user from being communicated. The recipient of the blockchain can then decrypt the AI module and use the AI module in that other environment, including further training the AI module for use in that other environment.

The techniques discussed herein improve the security of the computing devices. The AI modules can be securely and privately communicated to devices in other environments, protecting the privacy of the user communicating the AI module. Furthermore, personal information in an AI module can be erased prior to communicating the AI module to other users in other environments, preventing personal information of the user from being communicated to other users or environments.

Furthermore, the techniques discussed herein conserve device resources by sharing AI modules among multiple local devices (devices in the same environment). Each of multiple local devices need not expend resources training an AI module, but can rely on a single device to train the AI module and all benefit from the trained AI module.

Additionally, the techniques discussed herein improve operation of the devices in an environment by improving the consistency of the operations performed by the AI modules in the environment. An AI module trained by one device in the environment can be shared with other devices in the environment, so the same AI module will be performing the same operation on multiple devices, providing consistency in operation of the devices.

Figure 1:
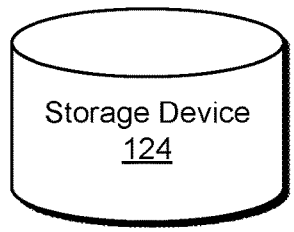
FIG. 1 illustrates an example computing device implementing the techniques discussed herein.
Figure 1:
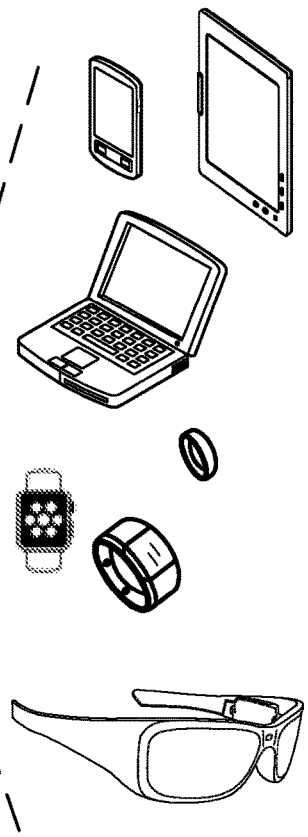

FIG. 1 illustrates an example computing device 102 implementing the techniques discussed herein. The computing device 102 can be, or include, many different types of computing or electronic devices. For example, the computing device 102 can be a smartphone or other wireless phone, a notebook computer (e.g., netbook or ultrabook), a laptop computer, a camera (e.g., compact or single-lens reflex), a wearable device (e.g., a smartwatch, a ring or other jewelry, augmented reality headsets or glasses, virtual reality headsets or glasses), a tablet or phablet computer, a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, a fitness tracker, a smart TV, an automotive computer, and so forth.

The computing device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 104, the microphone 106, and the speaker 108 can be implemented separately from the computing device 102. In such situations, the computing device 102 can communicate with the display 104, the microphone 106, and/or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 (e.g., the computing device 102 may be a television and the microphone 106 may be implemented in a remote control device) and voice inputs received by the microphone 106 are communicated to the computing device 102 via an IR or radio frequency wireless connection.

The computing device 102 also includes a processor system 110 that includes one or more processors, each of which can include one or more cores. The processor system 110 is coupled with, and may implement functionalities of, any other components or modules of the computing device 102 that are described herein. In one or more embodiments, the processor system 110 includes a single processor having a single core. Alternatively, the processor system 110 includes a single processor having multiple cores and/or multiple processors (each having one or more cores).

The computing device 102 also includes an operating system 112. The operating system 112 manages hardware, software, and firmware resources in the computing device 102. The operating system 112 manages one or more applications 114 running on the computing device 102 and operates as an interface between applications 114 and hardware components of the computing device 102.

The computing device 102 also includes a communication system 116. The communication system 116 manages communication with various other devices, including establishing voice calls with other devices, messaging with other devices, and so forth. This communication can take various forms, such as voice calls (e.g., over a cellular system, public switched telephone network (PSTN), network (e.g., using voice over Internet Protocol (VoIP), etc.), short messaging service (SMS) messages, multimedia messaging service (MMS) messages, and so forth.

The computing device 102 also includes an artificial intelligence (AI) system 118. The AI system 118 includes one or more of a variety of different public or proprietary machine learning systems. A machine learning system refers to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

The AI system 118 can be trained to perform various tasks. For example, the AI system 118 can be trained to detect particular users' faces, to detect particular users' voices, to detect the presence of people (regardless of who they are), to determine when to take particular actions (e.g., turn on a light or set an alarm), and so forth.

The computing device 102 also includes a customization system 120. The customization system 120 customizes or trains the AI system 118 to a particular user or environment. This includes customization or training of AI modules in the AI system 118 that are obtained from other users as discussed in more detail below.

The computing device 102 also includes an AI module transfer system 122. The AI module transfer system 122 manages obtaining AI modules from other devices as well as transferring AI modules from the AI system 118 to other devices, as discussed in more detail below.

Each of the AI system 118, the customization system 120, and the AI module transfer system 122 can be implemented in a variety of different manners. For example, each system 118, 120, and 122 can be implemented as multiple instructions stored on computer-readable storage media and that can be executed by the processor system 110. Additionally or alternatively, each system 118, 120, and 122 can be implemented at least in part in hardware (e.g., as an application-specific integrated circuit (ASIC), a field-programmable gate array (FPGA), and so forth).

The computing device 102 also includes a storage device 124. The storage device 124 can be implemented using any of a variety of storage technologies, such as magnetic disk, optical disc, Flash or other solid state memory, and so forth. The storage device 124 can store various program instructions and data for any one or more of the operating system 112, application 114, the AI system 118, the customization system 120, and the AI module transfer system 122.

Figure 2:
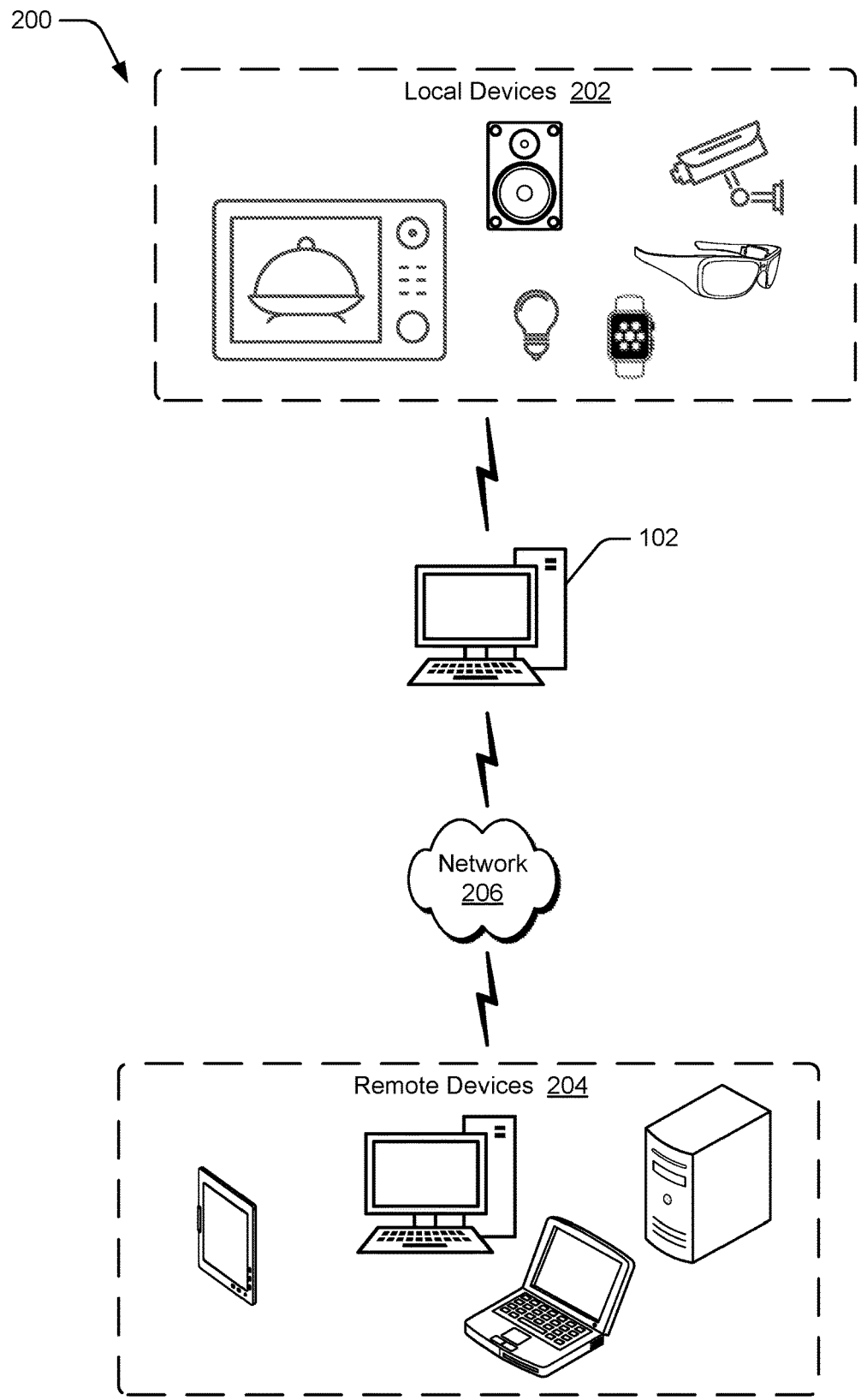
FIG. 2 illustrates an example system implementing the techniques discussed herein.

FIG. 2 illustrates an example system 200 implementing the techniques discussed herein. The system 200 includes the computing device 102 of FIG. 1. The computing device 102 communicates with various different local devices 202, which can be any of a variety of different types of computing or electronic devices as discussed above with reference to computing device 102. The local devices 202 are in an environment, which refers to the physical surroundings of the local devices 202 For example, the environment can be a home, an office, a vehicle, land (e.g., multiple acres of land), and so forth. In one or more implementations the local devices 202 are in a secure or private environment, such as a user's home. The computing device 102 and various local devices 202 can communicate with one another using any of a variety of wired or wireless connections, which may include various different networks (e.g., a local area network (LAN)). However, the communication between the computing device 102 and the various local devices 202 typically does not travel over a public network (e.g., the Internet).

The computing device 102 can also communicate with one or more of various remote devices 204 via a network 206. The remote devices 204 can be any of a variety of different types of computing or electronic devices as discussed above with reference to computing device 102. The network 206 can be a variety of different networks, including the Internet, a LAN, a public telephone network, an intranet, other public and/or proprietary networks, combinations thereof, and so forth. The remote devices 204 differ from the local devices 202 in that the remote devices 204 need not be in a secure or private environment.

Figure 3:
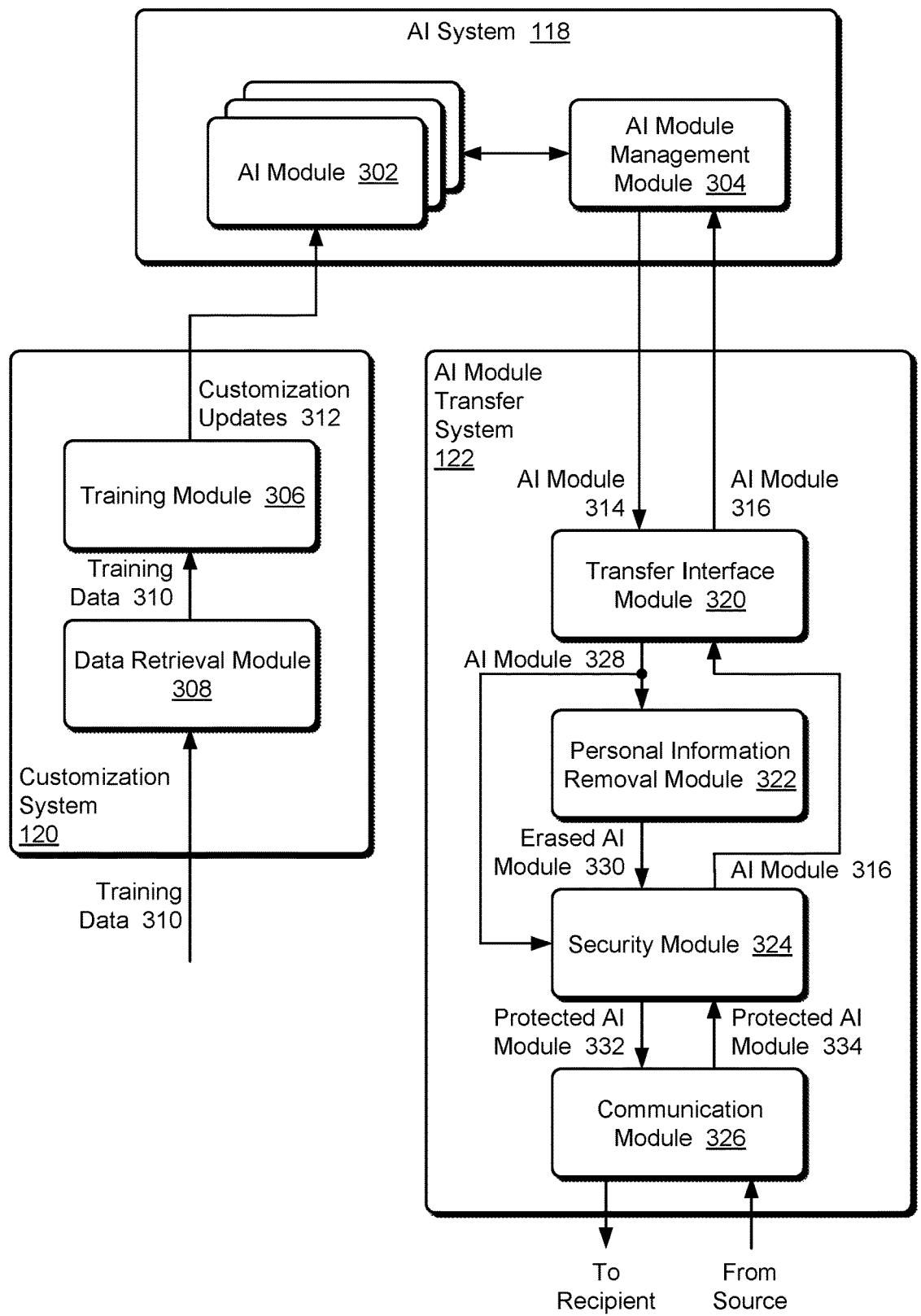
FIG. 3 illustrates an example AI system, customization system, and AI module transfer system in additional detail.

FIG. 3 illustrates an example AI system 118, customization system 120, and AI module transfer system 122 in additional detail. The AI system 118 includes one or more AI modules 302 and an AI module management module 304. Each AI module 302 can be any of a variety of different machine learning systems as discussed above. The AI module management module 304 manages the AI modules 302, which includes receiving AI modules from the AI module transfer system 122 and transferring AI modules to the AI module transfer system 122 as discussed in more detail below.

The AI system 118, the customization system 120, and the AI module transfer system 122 can be implemented in any of the local devices 202 or any of the remote devices 204 of FIG. 2. Each of the local devices 202 may implement one or more of these systems 118, 120, and 122, and share AI modules 302 with each other. For example, an AI module 302 trained by one local device 202 can be shared and transferred to any or all other local devices 202. Accordingly, each local device 202 need not repeat the training performed by another local device 202.

In one or more embodiments, one local device that is an AI server can be used to manage or coordinate the sharing of AI modules 302 among the various local devices 202. In situations in which local devices 202 are in a private or secure environment, further security or privacy measures need not be taken when sharing the AI modules 302. However, in situations in which an AI module 302 is communicated to another device (e.g., a remote device 204), additional security and privacy measures are taken as discussed in more detail below.

In one or more embodiments, the AI system 118 includes multiple AI modules 302 that can each be customized to perform different tasks. These tasks can include detecting people, detecting environment or ambient conditions, detecting actions taken, identifying actions to take, and so forth. The AI modules 302 can optionally be chained together to perform various operations, such as one AI module 302 detecting the presence of people in a home, which causes another AI module 302 to attempt to identify the presence of people in the home.

For example, one AI module 302 may receive data from various cameras in a home and be customized to detect the presence of any people in the home, another AI module 302 may receive data from various cameras in the home and be customized to detect the presence of a particular person in the home, another AI module 302 may receive data from various microphones in the home (standalone or as part of another device) to detect particular voices in the home, and so forth.

By way of further example, an AI module 302 may receive data from various cameras and microphones in a home and be customized to detect what ambient conditions or environmental factors make a user happy or sad, another AI module may receive data from various IoT devices or cameras and be customized to detect what ambient conditions or environmental factors indicate that a user is about to begin relaxing or going to bed, another AI module 302 may receive data from various IoT devices or cameras and be customized to detect what ambient conditions or environmental factors indicate that a user is about to begin exercising, and so forth.

By way of additional example, an AI module 302 may receive data from various cameras, IoT devices, or other AI modules 302 and be customized to detect what ambient conditions, environmental factors, or other AI module 302 outputs indicate that the user desires to turn on particular lights in his home. As another example, an AI module 302 may receive data from various cameras, IoT devices, or other AI modules 302 and be customized to detect what ambient conditions, environmental factors, or other AI module 302 outputs indicate that the user desires to turn on an audio experience (e.g., a radio) or change the volume of an audio experience. As another example, an AI module 302 may receive data from various cameras, IoT devices, or other AI modules 302 and be customized to detect what ambient conditions, environmental factors, or other AI module 302 outputs indicate that the user desires to turn off all lights and lock all the doors in his house.

The customization system 120 manages the customization of the AI modules 302 to users or the environment. This customization is performed by training the AI modules 302 based on data obtained from the users or the environment. The customization system 120 includes a training module 306 and a data retrieval module 308. The data retrieval module 308 receives training data 310 from any of a variety of different sources, such as local sources (e.g., sources in the same environment as the computing device 102, such as local devices 202) or remote sources (e.g., sources not in the same environment as the computing device 102, such as remote devices 204). The data retrieval module 308 provides the training data 310 to the training module 306.

In one or more embodiments, the training data 310 includes any data that can be detected or captured by the computing device, a local device 202, or a remote device 204. For example, the training data 310 can include images, video, audio, temperature, light level or brightness of the environment, time of day, time of year, temperature, device settings (e.g., radio channel, audio streaming service a device is connected to, cable channel or video streaming service a device is connected to), when a device is activated (e.g., powered on) or deactivated (e.g., powered off), biometric information for a user (e.g., temperature, heart rate), whether a user has his eyes open or closed, and so forth.

Additionally or alternatively, the training data 310 includes social media data. The social media data can be obtained from various different services, such as social media accounts allowing users to post media to pages, social media accounts allowing users to communicate images or video to others, and so forth. The data retrieval module 308 can obtain various social media data to use as training data 310, such as images, video, or audio received from particular users (e.g., users in a contacts list or address book of the user of the computing device 102), images, video or audio posted to a page by particular users (e.g., users in a contacts list or address book of the user of the computing device 102), and so forth. This allows the customization system 120 to train an AI module 302 to identify particular users (e.g., friends or business associates of the user of the computing device 102).

The data retrieval module 308 optionally retrieves certain types of social media data to use as training data 310. For example, the data retrieval module 308 can retrieve, to use as training data 310 for a user of computing device 102, social media data including friends of the user on a particular social media network (e.g., the Facebook® social network), followers of the user that have been marked as "friend" on a particular social media network (e.g., the Twitter® network), friends that have interacted with the user on a particular social media network, and so forth.

The training module 306 provides customization updates 312 to the AI system 118 in order to customize, also referred to as train, an AI module 302. The customization updates 312 modify features or weights of the AI module 302 based on the training data 310. This customization or training can be performed using supervised learning or unsupervised learning. For example, the training data 310 can have an associated tag describing the training data 310, the AI module 302 generates a tag based on the training data 310, and the training module 306 generates customization updates 312 so as to reduce or minimize a loss between the tag associated with the training data 310 and the tag generated by the AI module 302.

The AI module transfer system 122 manages obtaining AI modules 302 from other devices as well as transferring AI modules 302 from the AI system 118 to other devices. An AI module 302 (optionally customized by the customization system 120) to be transferred to another device is illustrated as AI module 314. An AI module received from another device is illustrated as AI module 316, which AI module management module 304 adds to the AI system 118 as an AI module 302. The AI module transfer system 122 includes a transfer interface module 320, a personal information removal module 322, a security module 324, and a communication module 326.

In some situations, a user of the computing device 102 desires to transfer an AI module 302 from the AI system 118 to another device. In such situations, the user provides input to the computing device 102 identifying a particular AI module 302 to transfer to the other device. The AI module management module 304 obtains and provides the requested AI module 314 to the transfer interface module 320. In one or more embodiments, the AI module management module 304 also deletes, from the AI system 118, the AI module 314 being transferred. Accordingly, in such embodiments the AI module 314 being transferred is no longer usable by the AI system 118. Additionally or alternatively, the AI module management module 304 need not delete, from the AI system 118, the AI module 314 being transferred.

AI system 118 can include different types of AI modules 302, including public modules and private modules. A public module refers to an AI module that does not contain personal information. A private module refers to an AI module that does contain personal information. Personal information can include information identifying the user as well as other information that the user desires to be kept private. For example, personal information can include weights or features of a machine learning system that has been trained to identify the face or voice of a particular user, weights or features of a machine learning system that has been trained to identify habits or preferences of the user, weights or features of a machine learning system that has been trained to identify characteristics of the user's environment (e.g., his or her home), and so forth. A public module can be, for example, a machine learning system trained to identify whether one or more people are present but not identify who those people are, a machine learning system trained to identify whether there is movement in the environment (e.g., a user's home) without identifying what object caused the movement, and so forth.

Which AI modules 302 are private and which are public can be determined in various different manners. In one or more embodiments, the user of the computing device 102 specifies which AI modules 302 are public and which are private. This allows the user to make the determination as to what he or she considers to be personal information.

Additionally or alternatively, which AI modules 302 are public and which are private can be determined in other manners, such as automatically by the AI module transfer system 122. For example, the AI module management module 304 may have various rules or criteria established to determine which AI modules 302 are public and which are private. These rules or criteria can be based on the inputs or outputs of the AI modules 302. E.g., an AI module 302 that receives images from one or more cameras and outputs a classification of either "people" or "no people" can be determined to be a public module whereas an AI module 302 that receives images from one or more cameras and outputs probabilities of the images including particular individuals can be determined to be a private module.

By way of another example, the AI system 118 may include a machine learning system (e.g., in the AI module management module 304 one of the AI modules 302) trained (e.g., by the training module 306) to determine whether a particular AI module 302 is public or private.

If the AI module 314 is a public module then the transfer interface module 320 provides the AI module 314 to security module 324. If the AI module 314 is a private module then the transfer interface module 320 provides the AI module 314 to the personal information removal module 322. The personal information removal module 322 removes the personal information from the AI module 314, providing an erased AI module 330 to the security module 324. The personal information removal module 322 removes the personal information from the AI module 314 by changing the weights or features in the machine learning system of the AI module 314. These weights or features can be changed in various manners, such as resetting the weights or features to their previous values (e.g., values they had when received by the AI system 118), resetting the weights or features to particular values (e.g., zeroes or ones), resetting the weights or features to random values (e.g., each weight or feature is given a random value), and so forth.

The security module 324 manages maintaining the security and privacy of the AI module 314 or the erased AI module 330, providing a protected AI module 332 to the communication module 326. The security module 324 can ensure secure and private communication of the AI module to another device in various different manners. For example, the security module 324 can encrypt the AI module 314 or the erased AI module 330 to protect the AI module from users other than the intended target from seeing or using the AI module. By way of another example, the security module 324 can communicate the AI module via a peer-to-peer network to avoid an intermediary (e.g., an email server) from seeing or using the AI module, helping ensure the user's privacy. The security module 324 can also use various techniques, such as blockchain, to maintain the security and privacy of the AI module 314 or the erased AI module 330 as discussed in more detail below.

The communication module 326 receives the protected AI module 332 and manages communication of the AI module 332 to another device. The recipient device for the AI module 332 can be specified in various manners, such as user input specifying the identifier of a particular device, the identifier (e.g., email address) of a user of the device, and so forth. The communication module 326 can provide the protected AI module 332 to the recipient in any of a variety of different manners, such as via the network 206 discussed above. The communication module 326 can also provide the protected AI module 332 to a blockchain approver or recorder.

In some situations, a user of the computing device 102 receives an AI module 302 from another device. In such situations, the communication module 326 receives a protected AI module 334 from a source. The security module 324 removes the various security and privacy constraints placed on the protected AI module 334 (e.g., by decrypting the protected AI module 334), and provides the unprotected AI module 316 to the transfer interface module 320. The manner in which the security module 324 removes the security and privacy constraints can vary based on the manner in which the source ensured secure and private communication of the AI module to the computing device 102.

The transfer interface module 320 provides the AI module 316 to the AI module management module 304. The AI module management module 304 receives the AI module 316 and adds the AI module 316 to the AI system 118 as one of the AI modules 302. The newly received AI module 316 can then be used as part of the AI system 118 in the same manner as any other AI module 302. This includes the customization system 120 customizing or training the newly received AI module 316.

In one or more embodiments, the newly received AI module 316 was previously trained (prior to receipt by the AI module transfer system 122) and is further customized by the customization system 120 performing further training. This training is based on training data 310, which can be obtained from any of a variety of different sources as discussed above.

In one or more embodiments, the security module 324 ensures secure and private communication of the AI module to another device using a blockchain. A blockchain refers to a series or chain of blocks that maintains a record of transactions across multiple computing devices in a peer-to-peer network. Use of a blockchain also provides some traceability to the AI module as all "owners" of the AI module are identified as either a source or a target in at least one block of the blockchain. Accordingly, an indication of who trained the AI module or where the AI module came from is maintained. The indication of who trained the AI module can be implicit (e.g., the first or second owner) or can be explicit (e.g., the AI module transfer system 122 may include an indication of the trainer of the AI module in the block.

Figure 4:
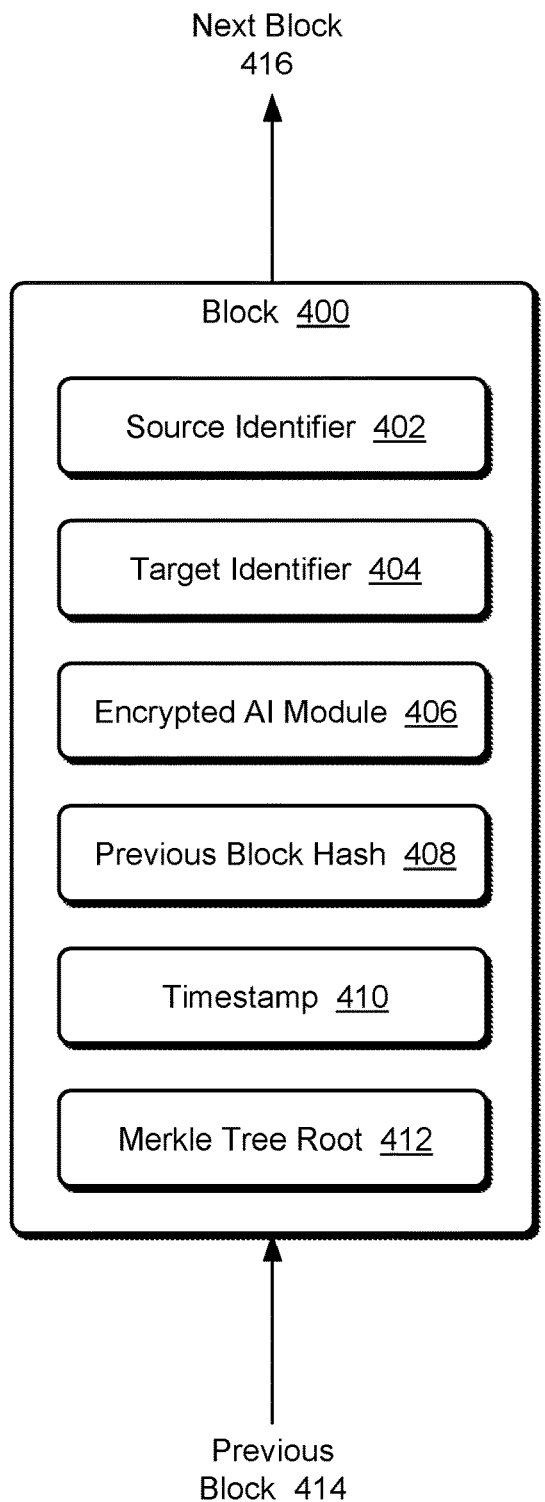
FIG. 4 illustrates an example block of a blockchain that can be used by the security module.

FIG. 4 illustrates an example block 400 of a blockchain that can be used by the security module 324. The block 400 includes a source identifier 402, a target identifier 404, an encrypted AI module 406, a previous block hash 408, a timestamp 410, and a Merkle tree root 412. The block 400 is a block in a blockchain having a previous block 414 and a next block 416.

The source identifier 402 is an identifier of the source of the AI module being communicated (AI module 314 or erased AI module 330). The identifier of the source of the AI module can be, for example, an identifier of the computing device 102, an identifier of the AI system 118, an identifier of a user of the computing device 102, and so forth.

The target identifier 404 is an identifier of the target of the AI module being communicated (AI module 314 or erased AI module 330). The identifier of the target of the AI module can be, for example, an identifier of the computing device to which the AI module is being communicated, an identifier of the AI system to which the AI module is being communicated, an identifier of a user of the computing device to which the AI module is being communicated, and so forth.

The encrypted AI module 406 is the AI module being communicated (AI module 314 or erased AI module 330) encrypted. In one or more embodiments, the AI module transfer system 122 generates a public/private key pair associated with the AI module being communicated and encrypts the AI module with the public key of the public/private key pair, resulting in encrypted AI module 406. The target of the AI module being communicated is provided with the private key of the public/private key pair, allowing the target to decrypt the encrypted AI module 406. Additionally or alternatively, the AI module transfer system 122 generates a symmetric key associated with the AI module being communicated and encrypts the AI module with the symmetric key, resulting in encrypted AI module 406. The target of the AI module being communicated is provided with the symmetric key, allowing the target to decrypt the encrypted AI module 406.

The previous block hash 408 is a hash of the previous block 414. The security module 324 can generate the previous block hash 408 using any of a variety of cryptographic hash functions, such as any of the Secure Hash Algorithm (SHA) family of hash functions (e.g., SHA256).

The timestamp 410 is a date and time for the block 400. This date and time can be, for example, the date and time that the security module 324 creates the block 400 or adds the block to the blockchain.

The Merkle tree root 412 is a data structure to summarize the transactions in the block 400. The Merkle tree root 412 is, for example, a cryptographic hash of the encrypted AI module 406. The security module 324 can generate the Merkle tree root 412 using any of a variety of cryptographic hash functions, such as any of the SHA family of hash functions (e.g., SHA256).

Various additional information can also be included in the block 400. For example, rather than including a single encrypted AI module 406, the block 400 may include multiple encrypted AI modules. By way of another example, the AI module transfer system 122 may receive an indication from the customization system 120 whether the customization system 120 customized the encrypted AI module 406, and if so the security module 324 can include data indicating that the source of the AI module being communicated trained the AI module. In situations in which additional information is included in the block 400, the Merkle tree root 412 is a cryptographic hash based on the encrypted AI module 406 and the additional information.

Returning to FIG. 3, the security module 324 can provide the private key of the public/private key pair (or the symmetric key) to the target of the AI module being communicated in any of a variety of different manners. For example, the key can be encrypted using another key (e.g., a public key of the target or a symmetric key known to both the security module 324 and the target). The encrypted key can then be communicated to the target using any of a variety of communication methods, such as email, manual transfer (e.g., storing the encrypted key on a thumb drive and handing the thumb drive to the target or user of the target), and so forth. In one or more embodiments, the encrypted key can be included in the block 400. In such situations, the Merkle tree root 412 is a cryptographic hash of a concatenation of the encrypted AI module 406 and the encrypted key.

In situations in which the AI module transfer system 122 receives a protected AI module 334 from another device, the target of the AI module 334 is, for example, the computing device 102, the AI system 118, a user of the computing device 102, and so forth. The security module 324 is aware of the public/private key pair of the target of the AI module 334 (or the symmetric key) and is thus able to decrypt the protected AI module 334 using the private key of the public/private key pair (or the symmetric).

In one or more embodiments, the security module 324 or the security module 324 in conjunction with the AI system 118 enforces one or more additional rules to maintain the security and privacy of the AI modules being transferred. For example, the AI module 302 can optionally be deleted after being communicated to another device, preventing the user of the computing device 102 from communicating the AI module 302 to multiple other users.

By way of another example, rules can be enforced to ensure that only the most recent recipient of the AI module 302 can use the AI module 302. This most recent user is, for example, the target in the last block of the blockchain (the block having the most recent timestamp). This can be ensured in various manners, such as the AI module management module 304 preventing an AI module 302 from being loaded into the AI system 118 or being used in the AI system 118 unless the target in the last block of the blockchain is, or is at, the computing device 102 (e.g., the target is the computing device 102, the AI system 118, or a user of the computing device 102).

By way of another example, rules can be enforced to ensure that transactions in the blockchain (the transfer of an AI module from the source to the target) are approved or recorded only to a particular one or more users. This can be ensured, for example, by the security module 324 verifying that the approver or recorder of the transactions in the block chain is included in a known list of users, that the approver or recorder of the transactions in the blockchain is known to the source and the target. E.g., the approver or recorder can provide a digital statement from the source (digitally signed by being encrypted with the private key of a public/private key pair of the source) indicating that the approver or recorder is known to the source, and a digital statement from the target (digitally signed by being encrypted with the private key of a public/private key pair of the target) indicating that the approver or recorder is known to the target.

The AI system 118, customization system 120, and AI module transfer system 122 support various different functionality for users of the computing device 102. One functionality supported by these systems 118, 120, and 122 is allowing a user (e.g., user A) to obtain an AI module, customize the AI module, and monetize his efforts by selling the trained AI module to another user (e.g., user B). As part of this sale the customized AI module is securely and privately communicated to user B. This further benefits user B as he need not expend the time and effort to customize the AI module as he has effectively paid user A to perform the customization.

Another functionality supported by these systems 118, 120, and 122 is allowing a user (e.g., user A) to obtain an AI module, customize the AI module for his use, and when no longer needed to monetize the AI module by selling the AI module to another user (e.g., user B). As part of this sale the customized AI module is securely and privately communicated to that user B. Furthermore, if the AI module was customized by user A to include personal information, that personal information is erased from the AI module prior to communicating the AI module to user B to protect the user A's privacy.

Another functionality supported by these systems 118, 120, and 122 is allowing a user (e.g., user A) to obtain an AI module from another user (e.g., user B) and further customize the AI module to perform the tasks he desires. For example, user A can customize an AI module by training the AI module to recognize user A's face. User A can then securely and privately communicate the trained AI module to his friend, user B. User B can then further customize the AI module by training the AI module to recognize user B's face. Accordingly, when user A visits user B's house, the AI module in user B's house can recognize user A's face and user B's face. Furthermore, user B can also securely and privately communicate the further customized AI module to user A, so when user B visits user A's house, the AI module in user A's house can recognize user A's face and user B's face.

Furthering this example, user B can also further customize the AI module using training data 310 that includes the user A's face. This training data 310 can be obtained from various sources, such as social media accounts, pictures communicated to user A's computing device by text messaging (e.g., a multimedia messaging service), and so forth. The customization system 120 can customize the AI module using training data 310 that includes both user A's face and user B's face to allow the AI module to better recognize both users' faces.

Another functionality supported by these systems 118, 120, and 122 is allowing a user (e.g., user A) to integrate social networks to establish social graph and access permission control. For example, at home, user A would like to give "visit" access to his friends on a particular social media network (e.g., the Facebook® social network) or followers that have been marked as "friend" on a particular social media network (e.g., the Twitter® network), or friends that have interacted with user A on a particular social media network. User A can integrate the social information into his home AI system 118, customizing AI modules 302 to recognize these friends (e.g., via faces). When one of those friends visits user A at his home, the AI system 118 or a local device (e.g., IoT security camera) will not send a general alarm to user A (e.g., in response to detecting something moving) but will send more customized and useful information such as "Monica is visiting you".

Figure 5:
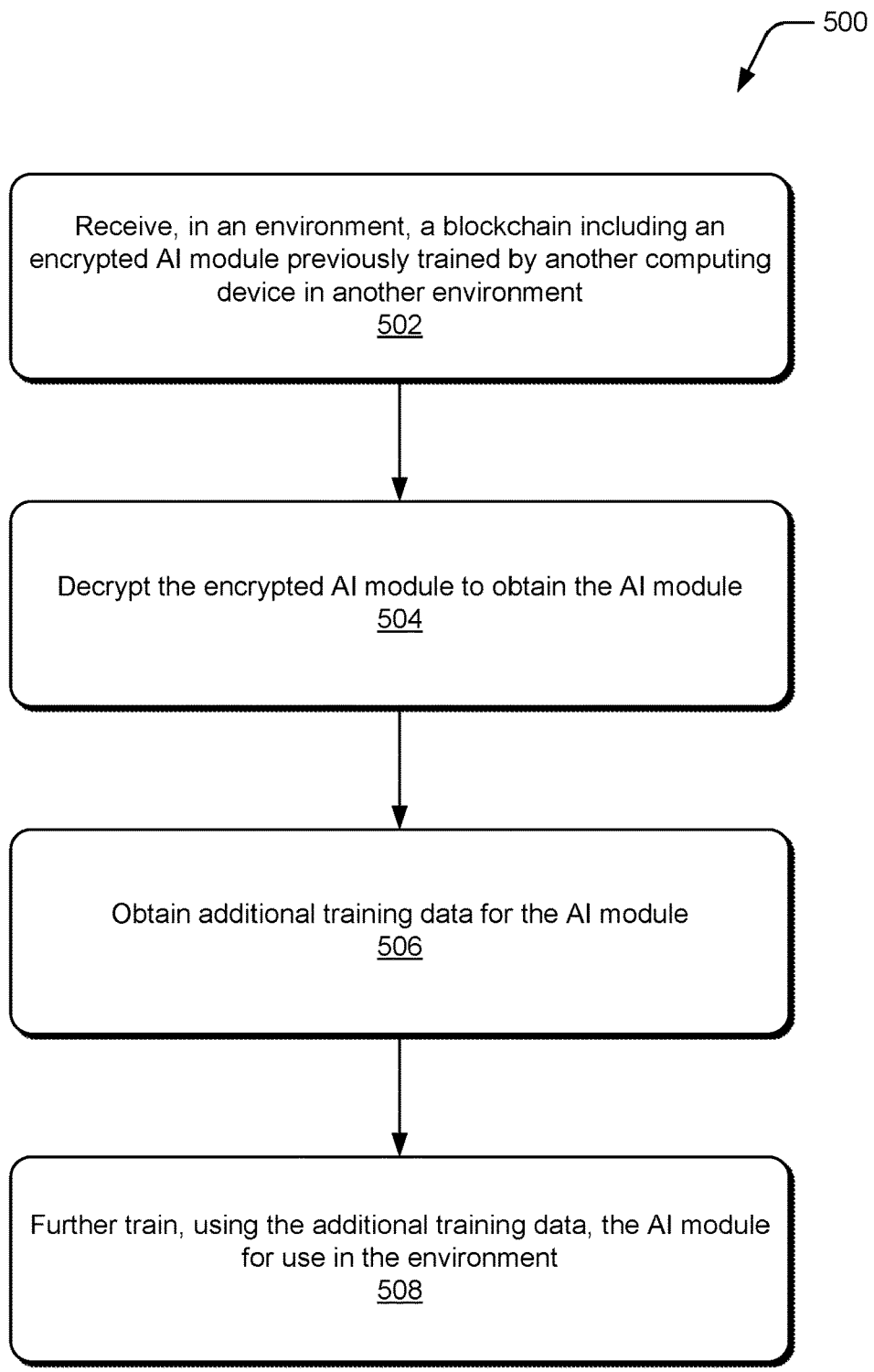
FIG. 5 illustrates an example process for implementing the techniques discussed herein in accordance with one or more embodiments.

FIG. 5 illustrates an example process 500 for implementing the techniques discussed herein in accordance with one or more embodiments. Process 500 is carried out by an AI system, a customization system, or a AI module transfer system, or a combination thereof, such as AI system 118, customization system 120, or AI module transfer system 122 of FIG. 1 or FIG. 3, and can be implemented in software, firmware, hardware, or combinations thereof. Process 500 is shown as a set of acts and is not limited to the order shown for performing the operations of the various acts.

In process 500, a blockchain is received by a computing device in an environment, the blockchain including an encrypted AI module trained by another computing device in another environment (act 502). The AI module can have been trained to perform any of a variety of operations as discussed above, such as to identify one or more users in the other environment.

The encrypted AI module is decrypted to obtain the AI module (act 504). The encrypted AI module can be decrypted in various manners, such as by using a public key of a public/private key pair.

Additional training data for the AI module is obtained (act 506). This additional training data includes data describing the environment, such as users in the environment, ambient conditions in the environment, and so forth. The additional training data can include data obtained from devices in the environment, from social media data, and so forth.

The AI module is further trained, using the additional training data, for use in the environment (act 508). Accordingly, the AI module is customized for operation in the environment but also benefits from training performed in the additional environment.

Figure 6:
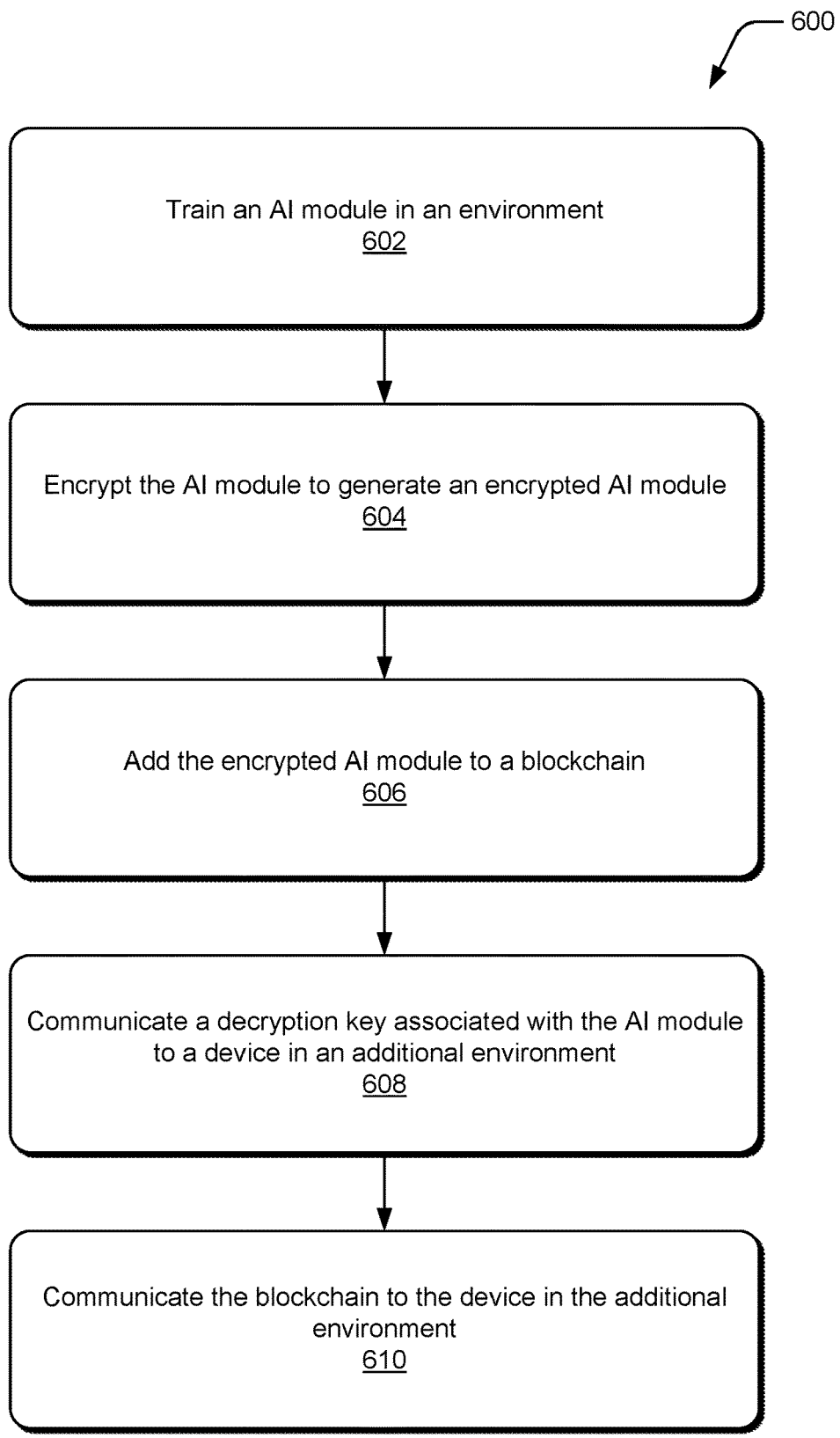
FIG. 6 illustrates another example for implementing the techniques discussed herein in accordance with one or more embodiments.

FIG. 6 illustrates another example process 600 for implementing the techniques discussed herein in accordance with one or more embodiments. Process 600 is carried out by an AI system, a customization system, or a AI module transfer system, or a combination thereof, such as AI system 118, customization system 120, or AI module transfer system 122 of FIG. 1 or FIG. 3, and can be implemented in software, firmware, hardware, or combinations thereof. Process 600 is shown as a set of acts and is not limited to the order shown for performing the operations of the various acts.

In process 600, an AI module is trained in an environment (act 602). The environment is, for example, a user's home. The AI module can be trained by any of various different computing devices in the environment.

The AI module is encrypted to generate an encrypted AI module (act 604). The AI module can be encrypted in various manners, such as by using a public key of a public/private key pair associated with the AI module.

The encrypted AI module is added to a blockchain (act 606). The encrypted AI module is added to a block of the blockchain, and various additional information can also be added to the block, such as an indication of a user that trained the AI module.

A decryption key associated with the AI module is communicated to a device in an additional environment (act 608). This decryption key is, for example, the private key of the public/private key pair associated with the AI module.

The blockchain is communicated to the device in the additional environment (act 610). The blockchain is communicate, for example, via a peer-to-peer network.

Figure 7:
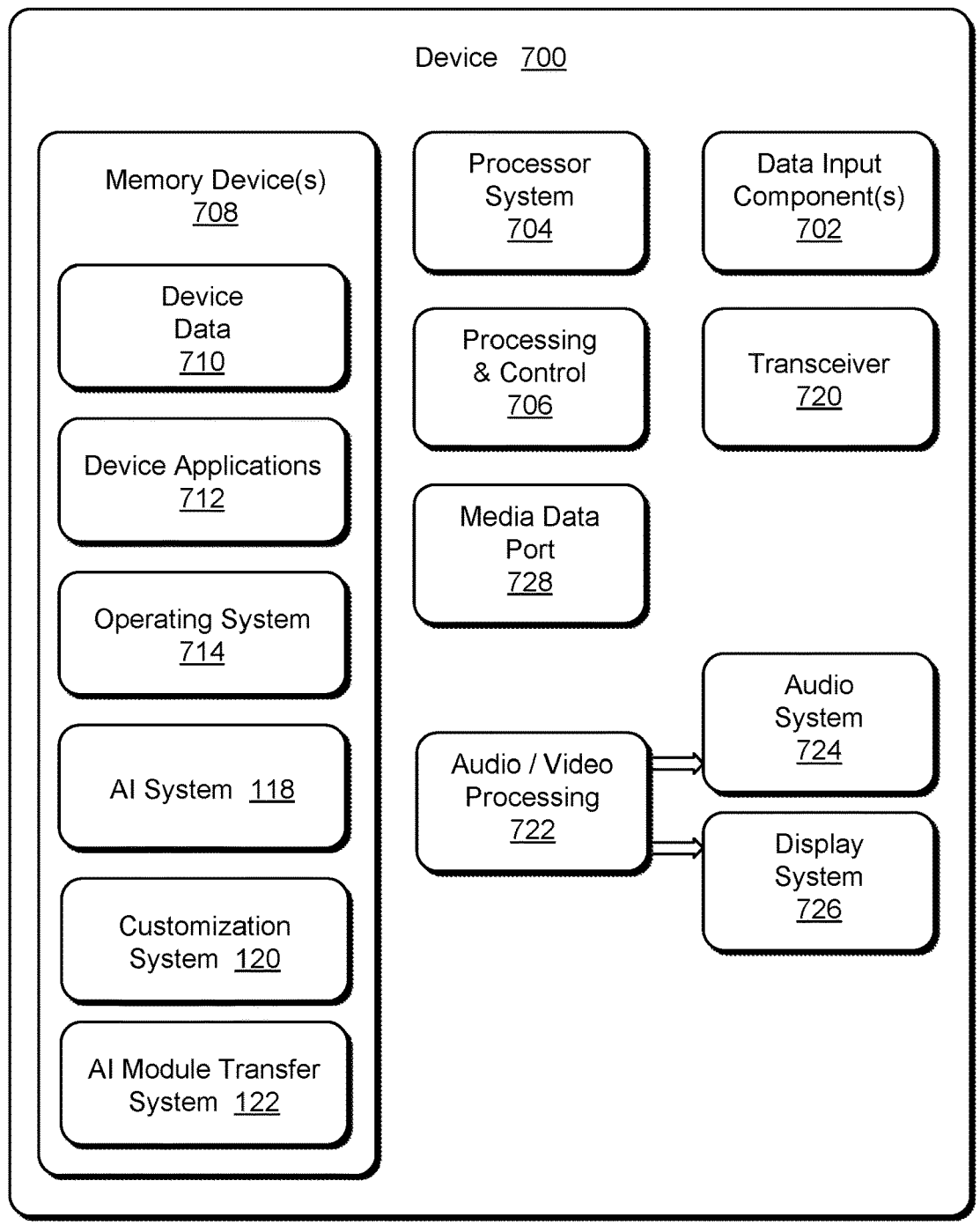
FIG. 7 illustrates various components of an example electronic device that can implement embodiments of the techniques discussed herein.

FIG. 7 illustrates various components of an example electronic device in which embodiments of securely communicating and customizing AI modules state can be implemented. The electronic device 700 can be implemented as any of the devices described with reference to the previous FIG.s, such as any type of client device, mobile phone, tablet, computing, communication, entertainment, gaming, media playback, and/or other type of electronic device.

In one or more embodiments the electronic device 700 includes at least one of the AI system 118, the customization system 120, and the AI module transfer system 122, described above. Although illustrated as including all of systems 118, 120, and 122, the electronic device 700 may include only one or only two of the systems 118, 120, and 122. For example, the electronic device 700 may include the AI system 118 and the customization system 120 but not include the AI module transfer system 122. By way of another example, the electronic device 700 may include only the AI system 118.

The device 700 includes communication transceivers 702 that enable wired and/or wireless communication of device data 704 with other devices. The device data 704 can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 700 may also include one or more data input ports 706 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 700 includes a processing system 708 of one or more processors (e.g., any of microprocessors, controllers, and the like) and/or a processor and memory system implemented as a system-on-chip (SoC) that processes computer-executable instructions. The processor system 708 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware.

Alternately or in addition, the device can be implemented with any one or combination of software, hardware, firmware, or fixed logic circuitry that is implemented in connection with processing and control circuits, which are generally identified at 710. The device 700 may further include any type of a system bus or other data and command transfer system that couples the various components within the device. A system bus can include any one or combination of different bus structures and architectures, as well as control and data lines.

The device 700 also includes computer-readable storage memory devices 712 that enable data storage, such as data storage devices that can be accessed by a computing device, and that provide persistent storage of data and executable instructions (e.g., software applications, programs, functions, and the like). Examples of the computer-readable storage memory devices 712 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 700 may also include a mass storage media device.

The computer-readable storage memory device 712 provides data storage mechanisms to store the device data 704, other types of information and/or data, and various device applications 714 (e.g., software applications). For example, an operating system 716 can be maintained as software instructions with a memory device and executed by the processing system 708. Additionally, although illustrated separate from the computer-readable storage memory device 712, the communication system 106 can be maintained as one of device applications 714. The device applications may also include a device manager, such as any form of a control application, software application, signal-processing and control module, code that is native to a particular device, a hardware abstraction layer for a particular device, and so on.

The device 700 can also include one or more device sensors 718, such as any one or more of an ambient light sensor, a proximity sensor, a touch sensor, an infrared (IR) sensor, accelerometer, gyroscope, thermal sensor, audio sensor (e.g., microphone), and the like. The device 700 can also include one or more power sources 720, such as when the device is implemented as a mobile device. The power sources may include a charging and/or power system, and can be implemented as a flexible strip battery, a rechargeable battery, a charged super-capacitor, and/or any other type of active or passive power source.

The device 700 additionally includes an audio and/or video processing system 722 that generates audio data for an audio system 724 and/or generates display data for a display system 726. In accordance with some embodiments, the audio/video processing system 722 is configured to receive call audio data from the communication system 106 and communicate the call audio data to the audio system 724 for playback at the device 700. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link. In implementations, the audio system and/or the display system are integrated components of the example device. Alternatively, the audio system and/or the display system are external, peripheral components to the example device.

Although embodiments of techniques for securely communicating and customizing AI modules have been described in language specific to features or methods, the subject of the appended claims is not necessarily limited to the specific features or methods described. Rather, the specific features and methods are disclosed as example implementations of techniques for implementing securely communicating and customizing AI modules. Further, various different embodiments are described, and it is to be appreciated that each described embodiment can be implemented independently or in connection with one or more other described embodiments. Additional aspects of the techniques, features, and/or methods discussed herein relate to one or more of the following:

A method comprising: receiving, by a first computing device in a first environment, a blockchain including an encrypted AI module previously trained using training data by a second computing device in a second environment; decrypting the encrypted AI module to obtain an AI module; obtaining, by the first computing device, additional training data for the AI module, the additional training data including data describing the first environment; and further training, using the additional training data, the AI module for use in the first environment.

Alternatively or in addition to the above described method, any one or combination of the following. The further training comprising training the AI module to identify a first user in the first environment, the AI module having been previously trained to identify a second user in the second environment, and the method further comprising using the AI module to identify, in the first environment, both the first user and the second user. The additional training data including images of the first user as well as images of the second user. The first environment comprising a home of the first user and the second environment comprising a home of the second user. The further training comprising training the AI module to identify a user in the first environment, the method further comprising obtaining, as at least part of the additional training data, images of additional users identified as friends of the user in social media networks. The method further comprising obtaining a private key of a public/private key pair for the AI module, and decrypting the encrypted AI module using the private key. The method further comprising providing, after further training the AI module, the AI module to additional computing devices in the first environment. The method further comprising: encrypting the AI module to generate a new encrypted AI module; adding the new encrypted AI module to the blockchain; communicating a decryption key associated with the AI module to a third computing device in a third environment; and communicating the blockchain, via a peer-to-peer network, to the third computing device in the third environment.

A method comprising: training, by a first computing device in a first environment, an AI module; encrypting the AI module to generate an encrypted AI module; adding the encrypted AI module to a blockchain; communicating a decryption key associated with the AI module to a second computing device in a second environment; and communicating the blockchain, via a peer-to-peer network, to the second computing device in the second environment.

Alternatively or in addition to the above described method, any one or combination of the following. The first environment comprising a home of a first user and the second environment comprising a home of a second user. The training comprising training the AI module to identify the first user. The method further comprising adding to the blockchain an indication that the first user is a trainer of the AI module. The method further comprising obtaining a public/private key pair associated with the AI module, the encrypting comprising encrypting the AI module using a public key of the public/private key pair, and the decryption key comprising the private key of the public/private key pair. The method further comprising: determining whether the AI module is a public module or a private module; and erasing, in response to determining that the AI module is a private module, personal information from the AI module. The determining comprising receiving user input specifying whether the AI module is a public module or a private module. The determining comprising automatically identifying whether the AI module is a public module or a private module. The method further comprising preventing, after communicating the blockchain to the second computing device, the AI module from being used at the first computing device.

A computing device in an environment, the computing device comprising: a processor; and a computer-readable storage medium having stored thereon multiple instructions that, responsive to execution by the processor, cause the processor to perform acts including: training an AI module; encrypting the AI module to generate an encrypted AI module; adding the encrypted AI module to a blockchain; communicating a decryption key associated with the AI module to an additional computing device in an additional environment; and communicating the blockchain, via a peer-to-peer network, to the additional computing device in the additional environment.

Alternatively or in addition to the above described computing device, any one or combination of the following. The acts further comprising: determining whether the AI module is a public module or a private module; and erasing, in response to determining that the AI module is a private module, personal information from the AI module. The determining comprising automatically identifying whether the AI module is a public module or a private module.

What is claimed is:
1. A method comprising:
training, by a first computing device in a first environment, a machine learning model;
encrypting the machine learning model to generate an encrypted machine learning model;
adding the encrypted machine learning model to a blockchain;
communicating a decryption key associated with the machine learning model to a second computing device in a second environment;
communicating the blockchain, via a peer-to-peer network, to the second computing device in the second environment;
deleting the machine learning model from the first computing device based on the machine learning model being communicated, within the blockchain, to the second computing device;

enabling use of the machine learning model by the second computing device based on the second computing device being identified as a target user in a last block of the blockchain; and preventing use of the machine learning model by the second computing device based on a different computing device being identified as the target user in the last block of the blockchain.

2. The method of claim 1, the first environment comprising a home of a first user and the second environment comprising a home of a second user.

3. The method of claim 2, the training comprising training the machine learning model to identify the first user.

4. The method of claim 2, further comprising adding to the blockchain an indication that the first user is a trainer of the machine learning model.

5. The method of claim 1, further comprising obtaining a public/private key pair associated with the machine learning model, the encrypting comprising encrypting the machine learning model using a public key of the public/private key pair, and the decryption key comprising a private key of the public/private key pair.

6. The method of claim 1, further comprising:
determining whether the machine learning model is a public module or a private module; and
erasing, in response to determining that the machine learning model is a private module, personal information from the machine learning model.

7. The method of claim 6, the determining comprising receiving user input specifying whether the machine learning model is a public module or a private module.

8. The method of claim 6, the determining comprising automatically identifying whether the machine learning model is a public module or a private module.

9. The method of claim 6, the determining comprising automatically determining that the machine learning model is a public module in response to the machine learning model outputting a classification of whether people are or are not in images analyzed by the machine learning model, and automatically determining that the machine learning model is a private module in response to the machine learning model outputting a probability of an image including a particular individual.

10. The method of claim 6, the determining comprising determining whether the machine learning model is a public module or a private module by using a machine learning system trained to determine whether the machine learning model is a public module or a private module.

11. The method of claim 6, wherein erasing the personal information from the machine learning model includes changing features or weights of the machine learning model.

12. The method of claim 1, further comprising verifying that an approver or recorder of a transaction including the communicating of the blockchain to the second computing device is within a known list of approvers or recorders.

13. A computing device in an environment, the computing device comprising:
a processor, and
a computer-readable storage medium having stored thereon multiple instructions that, responsive to execution by the processor, cause the processor to perform acts including:
training a machine learning model;
determining whether the machine learning model is a public module or a private module;
erasing, in response to determining that the machine learning model is a private module, personal information from the machine learning model by changing features or weights of the machine learning model;
encrypting the machine learning model to generate an encrypted machine learning model;
adding the encrypted machine learning model to a blockchain;
communicating a decryption key associated with the machine learning model to an additional computing device in an additional environment; and
communicating the blockchain, via a peer-to-peer network, to the additional computing device in the additional environment.

14. The computing device of claim 13, the acts further including deleting the machine learning model from the computing device based on the machine learning model being communicated, within the blockchain, to the additional computing device.

15. The computing device of claim 13, the acts further including:
enabling use of the machine learning model by the additional computing device based on the additional computing device being identified as a target user in a last block of the blockchain; and
preventing use of the machine learning model by the additional computing device based on a different computing device being identified as the target user in the last block of the blockchain.

16. A first computing device in a first environment, the first computing device comprising:
a customization system configured to train a machine learning model; and
a transfer system configured to:
determine whether the machine learning model is a private module or a public module based on whether the machine learning model detects presence of people or a particular person in images analyzed by the machine learning model;
erase, in response to the machine learning model being determined as a private module, personal information from the machine learning model;
encrypt the machine learning model to generate an encrypted machine learning model;
add the encrypted machine learning model to a blockchain;
communicate a decryption key associated with the machine learning model to a second computing device in a second environment; and
communicate the blockchain, via a peer-to-peer network, to the second computing device in the second environment.

17. The first computing device of claim 16, the first environment comprising a home of a first user and the second environment comprising a home of a second user.

18. The first computing device of claim 17, wherein to train the machine learning model is to train the machine learning model to identify the first user, and the transfer system is further configured to add an indication to the blockchain that the first user is a trainer of the machine learning model.

19. The first computing device of claim 16, wherein the transfer system is further configured to obtain a public/private key pair associated with the machine learning model, wherein to encrypt the machine learning model is to encrypt the machine learning model using a public key of the public/private key pair, and wherein the decryption key comprises a private key of the public/private key pair.

20. The first computing device of claim 16, wherein to erase the personal information from the machine learning model, the transfer system is configured to change features or weights of the machine learning model.

* * * * *